Patented Sept. 18, 1951

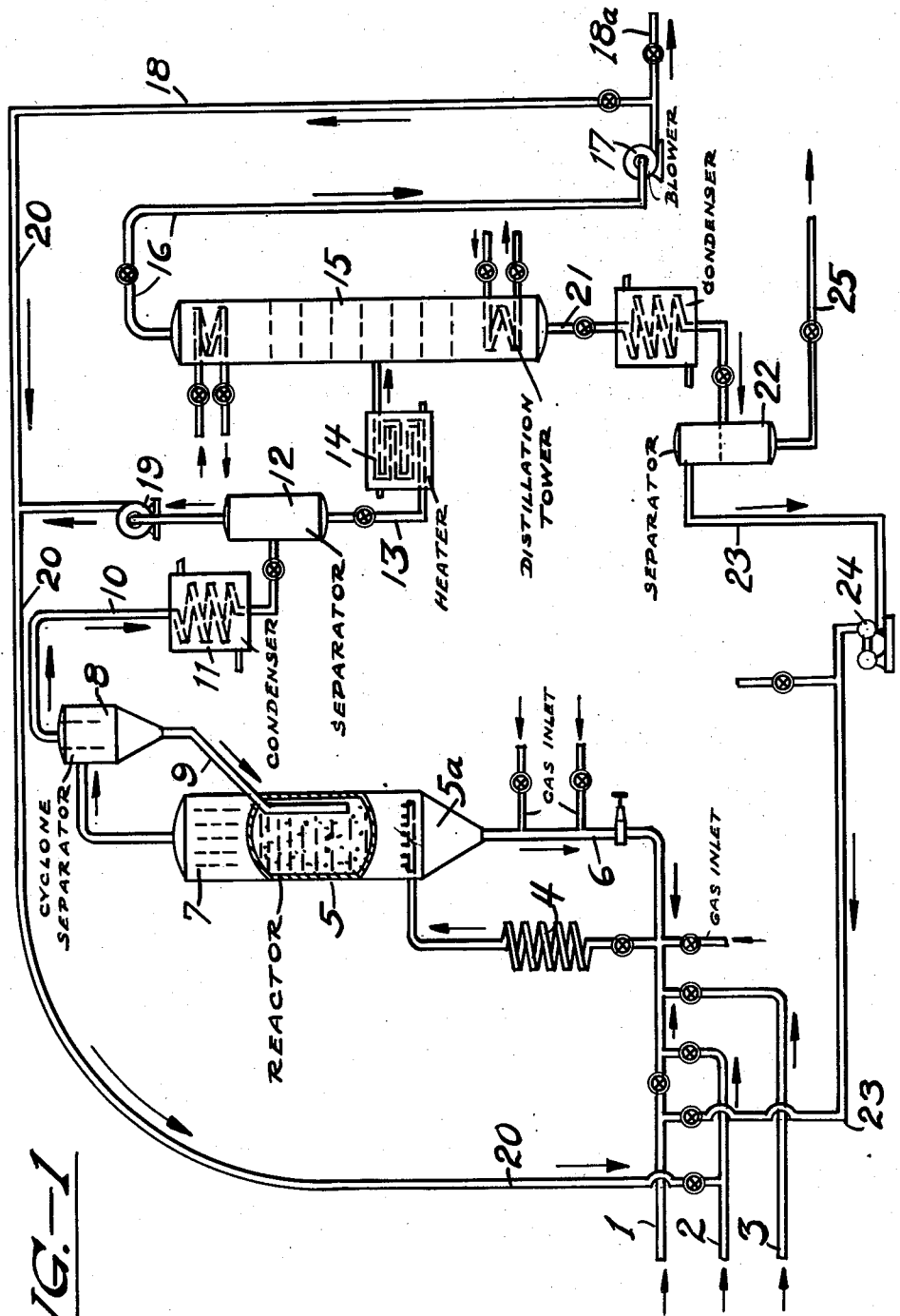

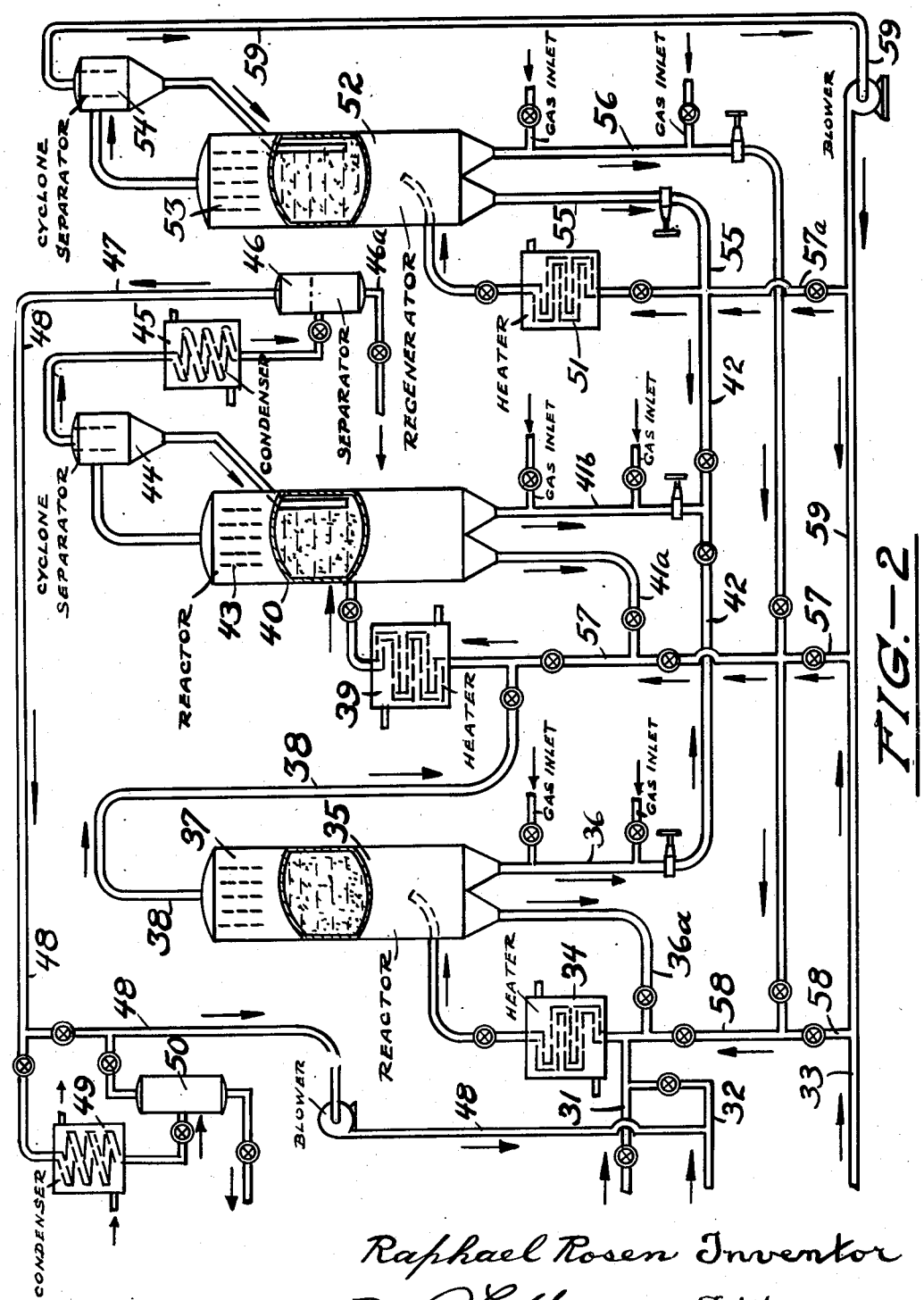

2,568,660

UNITED STATES PATENT OFFICE 2,568,660

FLUORINATION PROCESS

Raphael Rosen, Elizabeth, N. J., assignor, by mesne assignments, to the United States of America as represented by the United States Atomic Energy Commission Application July 16, 1942, Serial No. 451,117

2 Claims. (Cl. 260—653)

The present invention relates to improvements in the manufacture of halogenated hydrocarbons and more specifically to a method for producing fluorinated hydrocarbons. The invention will be fully understood from the following description.

The drawings are semi-diagrammatic views in sectional elevation of an apparatus for carrying out the process, Fig. 1 showing one method of operation and Fig. 2 showing a more complicated apparatus.

Halogenated hydrocarbons can be made by direct addition of the free gaseous halogen to the hydrocarbon but such processes are unsatisfactory principally because of the violence of the reaction which is extremely difficult to control so that there is a breakdown of the hydrocarbons and also a non-uniformity in the degree of halogenation.

It has been found that these difficulties can be overcome by the use of certain halogen carriers especially the trihalides of certain metals which have the property of decomposing to dihalides at temperatures below the decomposition temperatures of the hydrocarbons and particularly at temperatures below about 400° C. Such metal halides especially the trihalides of cobalt, silver and manganese, have proved to be the most satisfactory. When hydrocarbons are to be fluorinated, cobalt trifluoride may be used for this purpose. In order to make use of the above mentioned reaction, the present invention has been devised describing the most advantageous way in which it can be carried out.

Referring to the drawing, in Fig. 1, numeral 1 denotes the feed line thru which the hydrocarbon or other material to be fluorinated is fed. The hydrocarbon may be aliphatic, aromatic, gaseous, liquid or solid, but it is preferably fed as vapor along with an inert gas such as hydrogen fluoride, nitrogen or carbon tetrafluoride which is supplied by pipe 2. Fluorine is supplied by pipe 3 and as will be indicated below, the flow of the hydrocarbon and the fluorine may be during alternate periods or continually. Valves in pipes 1, 2 and 3 may be provided for controlling the flow. For purposes of illustration, the halogen will be referred to below as fluorine, the metal halide as the fluoride and the hydrocarbon generally as a normally liquid hydrocarbon.

The feed vapors pass through a temperature regulating coil 4 and into a reactor 5 in which the solid fluorinating agent is maintained in a finely divided condition and in what is known as a fluidized form, that is the solid material is suspended in a gaseous medium so that it is capable of flow like a liquid. The reactor is vertical and is provided with a conical base 5a from which a stream of fluidized powder is withdrawn by a pipe 6 which is connected with the inlet of the coil 4 so that the fluidized stream may be circulated through the coil and back to the reactor.

The upper part of reactor 5 contains dust separating apparatus indicated diagrammatically at 7 and an overhead pipe connects to a cyclone 8. Solids caught at the cyclone are separated from the gas and are returned to the reactor by pipe 9. The escaping gases and vapors pass by pipe 10 to a coil condenser 11 which is chilled to a point necessary for the condensation of the easily liquefiable materials comprising the hydrocarbons, fluorinated hydrocarbons heavier than carbon tetrafluoride as well as hydrogen fluoride. The liquid and vapor products are separated in drum 12, the liquid passing by pipe 13 and coil 14 to a fractionator 15 from which the hydrogen fluoride is removed as vapor by pipe 16. It may be recirculated as the inert gas by fan 17 and the lines 18 and 20 or it may be drawn off at 18a. The carbon tetrafluoride which is produced in the process in a small amount is preferable as a diluent to hydrogen fluoride and this may be recirculated by pipe 19 and 20 either alone or with the hydrogen fluoride as indicated above.

The liquid bottoms from the fractionator 15 is drawn off by pipe 21 to a settling drum 22 whereby two liquid layers are formed. The completely fluorinated materials are drawn off by pipe 25 as the lower layer while the hydrocarbons and the less fluorinated materials, comprising the upper layer, are drawn off by pipe 23 and these latter are circulated by pump 24 to the reactor for further reaction.

Within the reaction chamber 5, the solid fluorine carrier is maintained in a finely divided suspension or in what is perhaps better termed a "fluidized state." This condition is characterized by the fact that the suspension acts like a liquid, exhibiting static and dynamic or kinetic head. The ratio of solid to vapor is held within certain limits as will be disclosed below and the upward velocity is maintained at a specified value so that the solid does not settle into a compact layer in the bottom of the vessel but is maintained in a thick, heavy suspension within the chamber. There is sufficient agitation so that a condition of extremely uniform temperature exists throughout the entire vessel and a portion of the fluidized solid flows down through the conical bottom and through the circulating line 6 back to the inlet of the temperature regulating soil 4. It is necessary to have a certain minimum amount of gas along with the solid so as to make it capable of flow, as will be disclosed later, and additional gas may be added at the points indicated in the vertical portions of the circulating line 6, to maintain the fluidized condition to induce flow by varying the specific gravity of the suspension at different parts of the equipment.

In the operation of this apparatus of Fig. 1, several methods may be employed. In any case one suspends or "fluidizes" a metal trifluoride of the type disclosed and maintains the same in the fluidized condition in the vessel 5. A vaporized hydrocarbon alone or preferably along with an inert gas such as hydrogen fluoride may be passed in by the pipes 1 and 2. On entering the coil 4, this mixture of vapors comes in contact with the fluidized solid circulating through the line 6 and the mixture is then discharged into the body of the reactor 5. Temperature is maintained below about 400° C., preferably at 100 to 300° C., and under these conditions a portion of the fluorine is transferred from the metal trifluoride to the hydrocarbon so that a fluorinated hydrocarmon is produced and the solid is reduced from a trifluoride to a difluoride. Where branched chain hydrocarbons are used as feed stock the reaction is more difficult and temperatures are preferably 50 to 100 degrees centigrade higher than given above. The vaporized organic fluoride produced passes overhead, is collected in a vessel 12 and may be returned for further fluorination, if desired. It will be understood that for every atom of fluorine transferred, a molecule of hydrogen fluoride is also produced.

After most of the metal trifluoride has been reduced to difluoride, the flow of hydrocarbon may be discontinued by closing the valve in line 1 and free halogen (such as fluorine) may be added by pipe 3. The solid difluoride will be continuously maintained in a fluidized condition just as before and the fluorine passing into the reactor 5 will re-oxidize the solid difluoride to trifluoride. The temperature for regeneration is preferably above about 200° C. and below about 400° C. Any free fluorine which escapes overhead can be returned by pipes 19 and 20. When the metal difluoride has been substantially completely oxidized to the trifluoride, the hydrocarbon flow may be recommenced and the flow of the free flourine discontinued. In order to prevent the mixing of free fluorine with the hydrocarbon, it is possible to carry out a purging step between the two stages of the operation indicated above. During this step both the flow of the hydrocarbon and fluorine are discontinued, but the solid material is maintained in the fluidized condition entirely by the flow of the inert gas through pipe 2. The same step may be employed also after the flow of fluorine has been discontinued and before the flow of hydrocarbon has been resumed.

As a second type of operation which, however, is not quite so satisfactory as the above, a mixture of fluorine and hydrocarbon is introduced at the same time, suitably diluted with hydrogen fluoride or other diluent. It is believed that the mechanism of the reaction is substantially the same as indicated above, that is to say fluorine is added to difluoride to raise it to the trifluoride and this in turn passes it on to the hydrocarbon. Temperature and flow conditions are likewise substantially the same. In this case the inert gas is of especial importance where free fluorine and hydrocarbons are in contact and the proportion should be from 2 parts to 10 parts of inert gas per part of fluorine. This operation is preferably continuous.

In Fig. 2, another form of the apparatus is shown in which the hydrocarbons enter as before at 31, the inert gas by pipe 32 and fluorine by pipe 33. The hydrocarbons with or without the inert gas pass through coil 34 and into the first reactor 35 which is similar in practically all respects to that shown in Fig. 1. There is a recirculation leg 36a associated with it and a second conical bottom is provided which feeds pipe 36. This is used to carry a part of the fluidized solid to the regenerator 52 which will be referred to below. There are dust separators 37 in the upper part of the reactor 35 and a vapor line 38 is connected to coil 39, which feeds the second recator 40. This reactor again is similar to 35 but is held at a higher temperature so that a partial fluorination may be effected in the first and completed in the second reactor. This reactor is likewise fitted with two conical bottoms, one of which is employed to feed the circulation leg 41a and the second pipe 41b which conveys the solid powder to the regenerator. Pipes 36 from the reactor 35 and 41b from reactor 40 are conveniently joined into a single line 42 which directly feeds the regenerator. The second reactor 40 is likewise provided with separators 43 at its upper end and a secondary cyclone 44. The overhead vapors are condensed at 45 and the fully fluorinated hydrocarbons are collected at 46a. The uncondensed gases such as HF and $CF_4$ are drawn off by a pipe 47 and circulated by means of a pipe 48. If desired, the hydrogen fluoride may be condensed out by means of a coil condenser 49 and may be collected in the drum 50 and in this way only the $CF_4$ and permanent gases will be recirculated.

Regeneration is accomplished while the powder is also in a fluidized state in the regenerator 52, which is constructed like the reactors 35 and 40 with dust separators 53 and 54, circulating leg 55 and the fluidized solid draw-off line 56 which in turn feeds the regenerated solid material back to the reactors by pipe 56 and branched pipes 57 to the reactor 40 and pipe 58 to reactor 35. Fluorine is introduced by means of pipe 33, 57 and 57a, and the unused fluorine from the dust separator 54 may be recirculated by pipe 59.

From the above description the principal mode of operation of this apparatus will be clear but, as in the case of Fig. 1, the apparatus is capable of another type of operation. In this second type of operation the fluorine is fed by branched pipes 58 and 57 directly into the reactors 35 and 40 along with the hydrocarbon gas and the diluent so that there is no need for the regenerator 52. Suitable valves in the pipe 42 may be closed so as to cut off this part of the apparatus and the fluorine will be circulated directly through drum 46 and line 48 along with the inert gas. In this type of operation reaction and regeneration of the metal halide occurs in the reactors.

The operation of the apparatus shown in Fig. 2 is substantially the same as that in the apparatus in Fig. 1, except that the two reactors are maintained at successively higher temperatures. More reactors may be employed if desired. It is advantageous to maintain the first at a temperature of say 150° C., in the range of 100° to 200° C., and the second at about 250° C., say in the range from 200° to 300° C.

In both of the apparati shown, the solid material is maintained in a fluidized condition as has been described above. For this purpose the solid material should be reduced to less than about 50 mesh and a certain minimum quantity of gas which is necessary to maintain the fluid condition, is included. This amount is from say .005 to .025 cubic feet per pound of solid, the amount depending somewhat on the conditions of pressure and temperature employed and on the particular solid and the size to which it has been ground. More gas may be added to the suspension without causing it to break and the effect of the added gas is principally to cause a decrease in the density of the suspension. In order to maintain the fluid condition in the reactors, it is necessary to maintain an upward velocity in the range from about .10 to 10 feet per second and under these conditions it will not settle out to a compact solid layer, but flows around the circulating legs and flow lines just as is the case with a liquid. It is important to note that no pumps are required to operate on the gas containing solid and flow is induced throughout the apparatus by adjustment of the densities of opposing columns of the fluidized streams. Thus, referring to Fig. 1, circulation through the leg 6 and back to the reactor 5 is caused by maintaining a density of the fluidized material in the conical bottom 5a and in the downcoming pipe substantially greater than in the regulating coil 4 and the associated vertical lines. This is caused by the addition of the large amount of the hydrocarbon feed at the inlet of the coil. The product of this difference in density by the height of the columns is the measure of the force which causes the circulating flow and this should, of course, be calculated carefully so as to be sufficiently great to overcome the frictional resistance of the lines. Each portion of the apparatus must be carefully designed with these principles in mind so that the flow may be maintained from one portion of the apparatus continuously through the other.

The various reactors are protected against loss of heat by insulation or otherwise and heat may be supplied in the temperature regulating coils in order to keep the reaction going. The fluorination of the hydrocarbon produces sufficient heat to supply the process and therefore depending on the size of the installation only a small amount of heat need be added by the regulating coils, or in large installations it may even be necessary to remove some of the heat at that point. In the regenerating apparatus, heat is supplied through the coil.

The great advantage of the present equipment and process lies in the fact that the temperatures may be controlled with a high degree of accuracy throughout the apparatus and a high degree of mixing is obtained between the finely divided solid and the gaseous reactants. Due to these factors, it is possible to very carefully control the reaction and prevent temperature run-away with the result that the fluorination can be closely regulated so as to add only so much of the fluorine as is desired, anywhere from a mild degree of fluorination to complete fluorination. In an apparatus such as that shown in Fig. 1, the temperature in the apparatus may be started at 100° C., for example, and it may be held directly at that point so as to add only a small amount of fluorine to the hydrocarbon. If desired, it may be raised slowly through the range from 100° to 300° C. so as to produce completely fluorinated hydrocarbons and the degree of fluorination may be controlled quite accurately with the temperature so that the product may be taken off at any desired degree of fluorination. Temperature control also makes it possible to very substantially reduce hydrocarbon decomposition. However there is generally some portion of lower fluorinated products of 1 carbon atom but there is little or no portion, for example, of fluorinated products containing 2, 3, 4 and 5 carbon atoms when heptane for example is used as the feed.

In an apparatus such as shown in Fig. 2, a fully continuous process is illustrated in which constant temperatures are maintained in the two reactors, the second at somewhat higher temperature than the first. This is particularly advantageous in producing fully fluorinated products, continuously and on a large scale.

The present invention is not to be limited to any theory of the operation, to the particular types of hydrocarbons, or the particular metal trifluorides, but only to the following claims in which it is desired to claim all novelty inherent in the invention.

I claim:

1. A process of completely fluorinating a hydrocarbon, which comprises establishing a fluid suspension of finely divided cobalt trifluoride in a closed reaction zone, circulating a portion of said suspension from the bottom of said reaction zone to a point where it is mingled with incoming hydrocarbon vapors, carrying the mixture of said hydrocarbon vapors and said cobalt trifluoride suspension up through a temperature regulating zone and back into said closed reaction zone, reacting said hydrocarbon vapor with said cobalt trifluoride in said reaction zone to substitute fluorine atoms for the hydrogen atoms of said hydrocarbon, separating the gaseous reaction products from entrained cobalt fluoride, condensing the higher boiling gaseous reaction products, separating uncondensed carbon tetrafluoride therefrom, utilizing the separated carbon tetrafluoride as a diluent for incoming hydrocarbon vapors, fractionating the condensed higher boiling reaction products to boil off hydrogen fluoride, utilizing the boiled off hydrogen fluoride as a diluent for incoming hydrocarbon vapors, causing the liquid reaction products from which hydrogen fluoride has been boiled off to settle until two layers are formed, and returning the upper layer of incompletely fluorinated materials for further reaction with cobalt trifluoride.

2. A process as set forth in claim 1 in which the hydrocarbon being fluorinated is heptane.

RAPHAEL ROSEN.

REFERENCES CITED

The following references are of record in the file of this patent:

UNITED STATES PATENTS

| Number | Name | Date |
|---|---|---|
| 1,355,105 | Canon | Oct. 5, 1920 |
| 1,557,687 | Haggenmacher | Oct. 20, 1925 |
| 1,654,821 | Krause et al. | Jan. 3, 1928 |
| 1,677,831 | Krause | July 17, 1928 |
| 1,687,118 | Winkler | Oct. 9, 1928 |
| 1,799,858 | Miller | Apr. 7, 1931 |
| 1,810,055 | Muler | June 16, 1931 |
| 1,836,325 | James | Dec. 15, 1931 |
| 1,984,380 | Odell | Dec. 18, 1934 |
| 2,231,231 | Subkow | Feb. 11, 1941 |
| 2,399,488 | Hearne | Apr. 30, 1946 |

(Other references on following page)

FOREIGN PATENTS

| Number | Country | Date |
|---|---|---|
| 106,241 | Austria | Apr. 25, 1927 |
| 214,293 | Great Britain | Apr. 14, 1924 |
| 251,100 | Germany | Sept. 18, 1912 |
| 430,539 | Germany | June 23, 1926 |
| 513,947 | Great Britain | Oct. 26, 1939 |

OTHER REFERENCES

Ruff et al.: "Angewandte Chemie," vol. 47, page 480 (1934).

Ruff et al.: "Z. fur Anorg. & Allg. Chemie," vol. 219, pages 143-8 (1934).

Moissan: Comptes Rendus, vol. 130, pages 622-627, (1900).